Patented Dec. 9, 1941

2,265,976

UNITED STATES PATENT OFFICE 2,265,976

TERTIARY ALCOHOLS OF THE ESTRANE SERIES AND THEIR DERIVATIVES AND A PROCESS FOR THEIR MANUFACTURE

Hans Herloff Inhoffen, Berlin-Wilmersdorf, and Walter Hohlweg, Hohen-Neuendorf, near Berlin, Germany, assignors to Schering Corporation, Bloomfield, N. J., a corporation of New Jersey No Drawing. Application October 20, 1938, Serial No. 235,996. In Germany October 25, 1937

14 Claims. (Cl. 260—210)

The invention relates to tertiary alcohols of the estrane series and their derivatives and a process for their manufacture.

Application Ser. No. 111,363 describes and claims a process for the manufacture of tertiary alcohols of the cyclopentano-polyhydrophenanthrene series according to which on saturated or unsaturated compounds of the cyclopentano-polyhydrophenanthrene series, which contain in their cyclopentano ring a keto group, acetylene or substituted acetylenes are allowed to act in the presence of an alkali metal such as sodium or lithium, or an alkali metal compound, such as an alkali amide or alcoholate.

In accordance with the present invention the manufacture of tertiary alcohols of the estrane series is carried out particularly well when the action of the acetylene or its substitution products on saturated or unsaturated keto compounds of the estrane series takes place in the presence of anhydrous ammonia and alkali metal, suitably potassium. It is particularly suitable to dissolve the potassium in liquid ammonia, to introduce acetylene into this solution to the disappearance of the blue coloration of the solution and then to add the starting materials.

By this means the corresponding tertiary alcohols are obtained in excellent yield and in relatively pure condition.

As starting materials for the present process there come into consideration in particular both the follicle hormone estrone and also other unsaturated compounds of the estrane series, for example equilin and equilenin.

The hydroxy compounds unsaturated in the side chain thus obtained can now further be converted into the corresponding hydroxy derivatives as for example esters, ethers, glucosides and the like.

For the manufacture of such hydroxy derivatives there come into consideration the processes known per se (compare for example Houben-Weyl, Die Methoden der organischen Chemie, 1923, 2nd edn. vol. 3, page 1 et seq.). Thus for example by the action of acylating agents in a suitable indifferent solvent with or without addition of catalysts as for example sulphuric acid and/or acid-binding agents, as for example pyridine, caustic alkali solution, and the like, the hydroxyl groups present can be wholly or partly converted into the corresponding acid esters.

The glucosides can for example be formed by reacting a mono-saccharide in the presence of hydrochloric acid on the hydroxy compounds. Or partially acylated carbohydrates for instance penta-acetyl glucose in the presence of corresponding catalysts such as toluene sulphonic acid can be reacted upon the hydroxy compounds. Likewise halogen derivatives of acylated polyhydroxy aldehydes or ketones, for example acetobromo-glucose, can be employed preferably in the presence of an agent binding the halogen hydride formed, for example a base such as silver oxide, carbonate and the like.

If in the molecule together with the tertiary hydroxyl group additional hydroxyl groups are present, it is possible by the application of corresponding quantities of the acylating, alkylating and the like agents, to convert only one of the hydroxyl groups present into the corresponding hydroxy derivative.

The determination of the physiological activity of the ethinyl-estradiol on castrated mice has shown that this compound on subcutaneous injection still possesses exactly the same activity as estradiol, namely 0.1 γ. By the introduction of the ethinyl group in the estradiol, accordingly, its subcutaneous activity is not reduced.

A very remarkable activity of the ethinyl-estradiol comes into light however on peroral administration: Whereas estradiol is active perorally on castrated rats in an amount of 50 γ, the peroral limiting dose in the case of the ethinyl derivative is 3 γ.

The ethinyl dihydroequilin is even somewhat more strongly active in an amount of 2 γ.

The following examples illustrate the invention:

*Example 1*

In about 250 ccs. of liquid ammonia (cooled with dry ice and acetone) are dissolved about 7.5 grams of potassium and into the solution acetylene is passed until the blue colour has disappeared (about 3 hours). Then slowly a solution or suspension of 3 grams of estrone in 150 ccs. of benzene and 50 ccs. of ether is added. The freezing mixture is now removed, the whole allowed to stand for about 2 hours and the solution further stirred over night. Thereupon the reaction solution is treated with ice and water, acidified with sulphuric acid to an acid reaction to Congo red and the solution extracted five times with ether. The combined ether extracts are washed twice with water, once with 5% sodium carbonate solution and again with water until the washing water is neutral. Then the ether is evaporated, the residue dissolved in a little methanol and diluted with water. The separated product is recrystallised from aqueous methanol. The yield amounts to 2.77 grams. The 17-ethinyl-estradiol-3.17 thus obtained melts at 142-144° C.

Example 2

1.6 grams of 17-ethinyl-estradiol-3.17 are heated with a mixture of 10 ccs. of pyridine and 3 ccs. of acetic anhydride for 2 hours on a steam bath. After evaporation in vacuum the residue is recrystallised from aqueous methanol whereby the mono-acetate of 17-ethinyl-estradiol-3.17 is obtained in fine needles of melting point 136-142° C.; yield 1.4 grams.

On alkaline saponification of the mono-acetate the 17-ethinyl-estradiol-3.17 is reformed.

Example 3

250 mg. of 17-ethinyl-estradiol-3.17 are dissolved in a little methanol and the solution treated with 70 ccs. of 5% aqueous caustic potash lye. After evaporation of the methanol, to the aqueous solution 1 gram of benzoyl chloride is added and the mixture shaken over night. The separated product is filtered with suction, washed with water and dried. After recrystallisation from aqueous methanol the 3-benzoate of the 17-ethinyl-estradiol-3.17 is obtained in short prisms of melting point 203-204° C.; yield 227 mg.

Example 4

300 mg. of 17-ethinyl-estradiol-3.17 are dissolved in a little methanol and treated with 60 ccs. of 5% aqueous potassium hydroxide solution. After evaporation of the methanol the alkaline-aqueous solution is treated with 275 mg. of palmityl chloride and the mixture strongly shaken. Then the organic product is taken up in ether and the ether solution washed with dilute potassium hydroxide solution, water, dilute hydrochloric acid and again with water. After the evaporation of the ether the residue is recrystallised from aqueous methanol. The 3-palmitate of 17-ethinyl-estradiol-3.17 of melting point 58° C. is obtained.

Example 5

Into a solution of 3 grams of potassium in 150 ccs. of liquid ammonia, acetylene is passed to the decolorisation of the solution and then 2.2 grams of equilin, dissolved in 50 ccs. of dioxane and 50 ccs. of ether, are added. The reaction solution is left over night, then acidified and extracted with ether. The ether solution is washed with dilute sodium carbonate solution and water and the ether residue obtained after evaporation of the solvent recrystallised from dilute methanol.

The 17-ethinyl-dihydro-equilin thus obtained melts at 177-179° C.

Example 6

3 grams of potassium are dissolved in liquid ammonia. The solution is decolorised by passage of acetylene and to this solution 0.5 gram of equilenin acetate in 40 ccs. of ether and 40 ccs. of benzene are added. The whole is allowed to stand overnight and the reaction mixture worked up as set forth in Example 1. The ether residue is heated with 30 ccs. of N-methyl alcoholic caustic potash lye for 1 hour to boiling. The product is then acidified, extracted with ether and the ether washed neutral. The residue obtained after evaporation of the ether is distilled in high vacuum at 175-180° C. The oil distilled over, which solidifies in the cold, is recrystallised from ethylacetate. The ethinyl-equilenin thus exhibits a melting point of 179° C. By benzoylation in aqueous-alkaline solution with benzoyl chloride there is obtained the corresponding benzoate of melting point 225° C.

Of course, various other modifications in the procedure of the process of the present invention may be restorted to within the scope of the appended claims without departing from the principles set forth herein.

What we claim is:

1. Process for the manufacture of tertiary alcohols of the estrane series, wherein an acetylene is reacted on a keto compound of the estrane series in the presence of anhydrous ammonia and an alkali metal.

2. Process as claimed in claim 1, in which as starting material estrone is employed.

3. Process as claimed in claim 1, in which the tertiary alcohol of the estrane series obtained is converted into the corresponding hydroxy derivative of the group consisting of esters, ethers and glucosides.

4. Process as claimed in claim 1, in which the obtained tertiary alcohols are converted into the corresponding acyl derivatives by reaction with an acylating agent.

5. Process as claimed in claim 1, in which the alkali metal is potassium.

6. Process for the manufacture of tertiary alcohols of the estrane series, wherein an acetylene is reacted on a compound of the estrane series in a solution of an alkali metal in liquid ammonia.

7. Process for the manufacture of tertiary alcohols of the estrane series in which acetylene is reacted on estrone in the presence of ammonia and an alkali metal and in which the obtained ethinyl estradiol is caused to react with an acylating agent.

8. Process as set forth in claim 7, wherein the obtained ethinyl estradiol is caused to react with an acylating agent in the presence of acid binding agents.

9. An isolated 17-ethinyl-dihydro-equilin of the general formula $C_{20}H_{21}OR$ and the structural formula

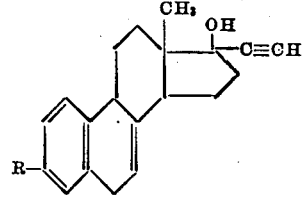

wherein R stands for a member of the group consisting of the hydroxyl group and groups that, on hydrolysis, can be converted into a hydroxyl group.

10. An isolated 17-ethinyl-dihydro-equilenin of the general formula $C_{20}H_{19}OR$ and the structural formula

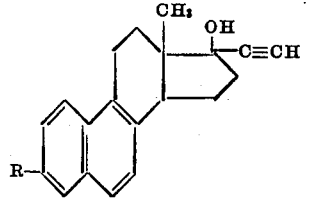

wherein R stands for a member of the group consisting of the hydroxyl group and groups that, on hydrolysis, can be converted into a hydroxyl group.

11. Ethers of 17-X-dihydro follicle hormones, X being a member of the class consisting of ethinyl and substituted ethinyl groups.

12. Glucosides of 17-X-dihydro follicle hormones, X being a member of the class consisting of ethinyl and substituted ethinyl groups.

13. The monobenzoate of a 17-ethinyl derivative of an unsaturated compound of the estrane series.

14. Process for the manufacturoe of tertiary alcohols of the estrane series, comprising dissolving an alkali metal in liquid ammonia, introducing acetylene into the solution until the blue coloration has disappeared, then adding to the mixture a keto compound of the estrane series, thereafter acidifying the reaction solution, and recovering the tertiary alcohol formed.

HANS HERLOFF INHOFFEN.
WALTER HOHLWEG.